United States Patent [19]
Douek et al.

[11] 3,996,308
[45] Dec. 7, 1976

[54] ANAEROBIC PRESSURE SENSITIVE ADHESIVE COMPOSITION

[75] Inventors: Maurice Douek, Los Angeles; Gustav A. Schmidt, South Pasadena, both of Calif.; Bernard M. Malofsky, Bloomfield; Martin Hauser, West Hartford, both of Conn.

[73] Assignees: Avery Products Corporation, San Marino, Calif.; Loctite Corporation, Newington, Conn. ; part interest to each

[22] Filed: Feb. 19, 1974

[21] Appl. No.: 443,223

[52] U.S. Cl. .......................... 260/859 R; 260/27 R; 260/861; 260/873; 260/884; 260/885
[51] Int. Cl.² ........................................... C08L 75/04
[58] Field of Search ..................................... 260/859

[56] References Cited
UNITED STATES PATENTS

| | | | |
|---|---|---|---|
| 3,130,175 | 4/1964 | Peter | 260/859 R |
| 3,227,778 | 1/1966 | Delius | 260/859 R |
| 3,396,210 | 8/1968 | McKillip | 260/859 R |
| 3,509,234 | 4/1970 | Burlant | 260/859 R |
| 3,625,875 | 12/1971 | Frauenglass | 260/17 A |
| 3,641,199 | 2/1972 | Niederhauser | 260/859 R |
| 3,677,920 | 7/1972 | Kai | 260/859 R |
| 3,678,014 | 7/1972 | Suzuki | 260/859 R |
| 3,751,378 | 8/1973 | Cowperwaithe | 260/859 R |
| 3,772,404 | 11/1973 | Knight | 260/859 R |

*Primary Examiner*—Carman J. Seccuro
*Attorney, Agent, or Firm*—Jean B. Mauro

[57] ABSTRACT

There is provided a curable anaerobic pressure sensitive adhesive composition, a mixture of a curable anaerobic system and a high molecular weight polymer system. The mixture which may include a tackifier and other functional additives constitutes a pressure sensitive adhesive and exhibits elastomeric properties. There is also provided in the composition an initiator system necessary to permit curing of the anaerobic pressure sensitive composition upon activation by the exclusion of oxygen. One or more accelerators for cure may also be provided.

In one embodiment a component of the catalyst system may be either absent and provided later or latently present in microspheres which upon rupture will enhance the curing operation.

12 Claims, No Drawings

ANAEROBIC PRESSURE SENSITIVE ADHESIVE COMPOSITION

BACKGROUND OF THE INVENTION

Anaerobic adhesive systems are those which are stable in the presence of oxygen, but will polymerize in the absence of oxygen. Polymerization is initiated by the presence of a peroxy compound. The cured, crosslinked resins serve as sealants and as adhesives.

Typical resin monomers are terminated with polymerizable acrylate esters such as methacrylate, ethacrylate and chloracrylate esters. The other ingredients typically present are an initiator, preferably an organic hydroperoxide such as cumene hydroperoxide, tertiary butyl hydroperoxide and the like. There is also normally provided a stabilizer against free radical initiation, such as a quinone or hydroquinone, in an amount sufficient to prevent premature polymerization of the adhesive due to decomposition of the peroxy compound. There are also preferably present one or more accelerators which are preferably nitrogen-containing compounds such as tertiary amines, imids, sulfamids and the like which promote the rate of cure.

Cure will be accelerated by the presence of a suitable metal, such as a transition metal, or its ion.

An anaerobic adhesive is applied to one or both of the surfaces to be joined. When the two surfaces are joined and oxygen excluded, cure will be initiated. As is well known, surfaces such as glass may require application of a suitable accelerator such as a transition metal compound, which will increase the rate of cure upon the substantial exclusion of oxygen or air.

Anaerobic adhesives have been well published in the art as for instance, in U.S. Pat. Nos. 2,895,950; 3,041,322; 3,043,820; 3,046,262; 3,203,941; 3,218,305; 3,300,547; 3,435,012, 3,547,851 and 3,625,875.

Anaerobic adhesive systems are typically supplied from a water-like liquid to a light-weight grease in consistency. One end-use application is to apply the adhesive to the threads of a bolt or mating nut which are then assembled. The adhesive fills the spaces between the threads which excludes oxygen and enables cure. In the normal situation, the metals present in the bolt or the nut accelerate cure.

A problem exists, however, in fixturing other surfaces together with initiation and completion of cure, and in providing a controlled quantity of anaerobic monomer to the surfaces to be bonded. No prior art composition provides the desirability and convenience of instant fixturing merely by finger pressure combined with sufficient cured strength to provide bonds of structural integrity.

SUMMARY OF THE INVENTION

According to the present invention, there are provided anaerobic pressure sensitive adhesive compositions which can be applied from or as sheets, tapes and the like to substrates to be bonded by cure upon the exclusion of oxygen.

The anaerobic pressure sensitive adhesives compositions of this invention include a curable anaerobic resin system containing one or more anaerobic resins combined with a thermoplastic polymer system containing one or more high molecular weight thermoplastic polymers, the combination of which alone or upon inclusion of a tackifier, constituting a pressure sensitive adhesive system upon evaporation of essentially all of the solvent present. Further, there is provided in the anaerobic pressure sensitive adhesive composition an initiator system which is latent until made active by substantial exclusion of oxygen, preferably in combination with a suitable accelerator.

In one embodiment, if the anaerobic pressure sensitive adhesive system contains free transition metal ions, then at least the peroxy initiator may be encapsulated in microspheres which, upon rupture, and upon the exclusion of oxygen, will initiate cure. In another embodiment, a suitable metal accelerator may be encapsulated.

If metals which act as accelerators are present and an encapsulation technique is not employed, then the metals should be inactivated. This may be accomplished by scavenging each component of the system with a chelating agent, which may then be removed, if desired.

The thermoplastic polymers used in the preparation of the pressure sensitive anaerobic compositions of this invention are preferably of sufficient molecular weight so as to be elastomeric at room temperature. Further, they must be capable of being combined with the anaerobic resins and not greatly interfere with the creation of a cross-linked latticework of the anaerobic resins and prevent bending of the cured anaerobic polymer to the selected substrates to be joined.

In general, the amount of anaerobic resins combined with the thermoplastic polymer will range from about 35 to about 99% by weight based on the total weight of the anaerobic resins provided and the thermoplastic polymer(s) with which it is combined, and, if present, a tackifier but exclusive of the amount of initiator system added. The preferred amount of anaerobic resin(s) combined in the thermoplastic polymer(s) is from about 55 to about 95% by weight.

In addition, the thermoplastic polymer must be selected such that the composition alone or with tackifiers and upon the inclusion of an initiator system will form, after solvent evaporation, a curable pressure sensitive adhesive layer or film of sufficient cohesive strength to be applied to a substrate from differential release surfaces without disruption of the layer or film. The fully formulated, essentially solvent-free anaerobic pressure sensitive adhesive should be elastomeric at room temperature.

In addition, anaerobic pressure sensitive adhesive compositions should when applied to a surface, wet the surface and conform to the intricacies of the surface so that a uniform bond will be created upon cure and that cure will extend throughout the layer of applied anaerobic pressure sensitive composition to maximize cohesive bond strength.

To constitute a suitable pressure sensitive adhesive of this nature, the net composition when free of solvent should have, prior to cure, a static shear strength of at least about 2 minutes at a 250 gram load per 0.25 square inch and a 180° peel value of at least about 0.5 lb per inch, preferably at least about 1.0 lb per inch when using standard test methods.

DESCRIPTION OF THE INVENTION

According to the present invention there are provided curable anaerobic pressure sensitive adhesive compositions which will cure in the presence of a peroxy or perester compound and in the absence of oxygen.

By the term "anaerobic resin system" as used herein, there is meant one or more anaerobic resins having at least one, preferably two, polymerizable acrylate ester moieties, normally on the ends of the backbone, which will polymerize or cure in the presence of a peroxy initiator and upon the substantial exclusion of oxygen or air, and preferably also in the presence of a suitable accelerator system.

Illustrative, but in no wise limiting, of the anaerobic resins which can be used in the preparation of pressure sensitive adhesive compositions of the invention are polymerizable acrylate esters. As used herein, "acrylate esters" include the alpha-substituted acrylate esters, such as the methacrylate, ethacrylate, and chloracrylate esters.

Of particular utility as adhesive monomers are polymerizable di-and other polyacrylate esters since, because of their ability to form cross-linked polymers, they have more highly desirable adhesive properties. However, monoacrylate esters can be used, particularly if the non-acrylate portion of the ester contains a hydroxyl or amino group, or other reactive substituent which serves as a site for potential cross-linking. Examples of monomers of this type are hydroxyethyl methacrylate, cyanoethyl acrylate, t-butylaminoethyl methacrylate and glycidyl methacrylate. Anaerobic properties are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

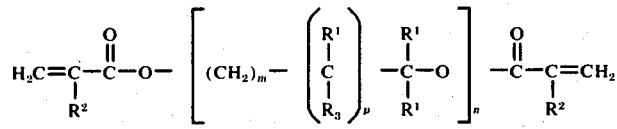

wherein $R^1$ represents a radical selected from the group consisting of hydrogen, lower alkyl of from 1 to about 4 carbon atoms, hydroxy alkyl of from 1 to about 4 carbon atoms, and the radical

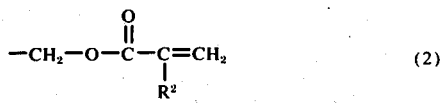

$R^2$ is a radical selected from the group consisting of hydrogen, halogen, and lower alkyl of from 1 to about 4 carbon atoms; $R^3$ is a radical selected from the group consisting of hydrogen, hydroxyl, and

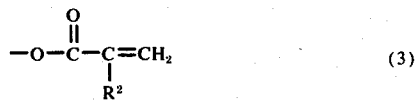

$m$ is an integer equal to at least 1, e.g., from 1 to about 15 or higher, and preferably from 1 to about 8 inclusive; $n$, is an integer equal to at least 1, e.g., 1 to about 20 or more; and $p$ is one of the following: 0,1.

The polymerizable polyacrylate esters utilized in accordance with the invention and corresponding to the above general formula are exemplified by, but not restricted to the following materials: di-, tri- and tetraethylene glycol dimethacrylate, dipropylene glycol dimethacrylate, polyethylene glycol dimethacrylate, di (pentamethylene glycol) dimethacrylate, tetraethylene glycol diacrylate, tetraethylene glycol di (chloracrylate), diglycerol diacrylate, diglycerol tetramethacrylate, tetramethylene dimethacrylate, ethylene dimethacrylate, neopentyl glycol diacrylate and trimethylol propane triacrylate.

Yet, another class of acrylate esters are those which are formed by the reaction of:
 a. an acrylate ester containing an active hydrogen atom in the alcoholic moiety of the ester; with
 b. an organic polyisocyanate.

Compositions including this general type of ester are disclosed in U.S. Pat. No. 3,425,988. Preferably, the active hydrogen is the hydrogen of a hydroxyl or a primary or secondary amine substituent on the alcoholic moiety of the ester, and the polyisocyanate is a diisocyanate. Naturally, an excess of the acrylate ester should be used to ensure that each isocyanate functional group in the polyisocyanate is substituted.

The most preferred of the acrylate esters used in the manner described in the preceding paragraph are those in which the acrylate ester is a substituted alkyl or aryl acrylate ester, most preferably having the formula:

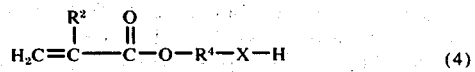

wherein X is

where $R^5$ is a hydrogen atom or a monovalent hydrocarbon radical containing up to 10 carbon atoms, and is preferably a hydrogen atom or an alkyl or aralkyl radical with from 1 to 10 carbon atoms; $R^2$ is as defined above; and $R^4$ is an alkylene radical with from 1 to 10 carbon atoms, or a divalent aromatic radical containing up to 14 carbon atoms, preferably phenylene, biphenylene or naphthylene.

Naturally $R^5$ and $R^4$ can contain any substituents or linkages which do not adversely affect the molecule for its intended use herein.

Typical polyisocyanates which can be reacted with the above acrylate esters to form polyacrylate monomers are toluene diisocyanate, 4,4'-diphenyl diisocyanate, di-anisidine diisocyanate, cyclohexylene diisocyanate, 2-chloropropane diisocyanate, 4,4'-diphenylmethane diisocyanate, 2,2'-diethyl ether diisocyanate, 3-(dimethylamino)- pentane diisocyanate, tetrachlorophenylene diisocyanate-1,4 and trans-vinylene diisocyanate. Still other polyisocyanates that may be used are higher molecular weight polyisocyanates obtained by reacting an excess of any of the above described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, 4,4'-dihydroxydiphenyldimethylmethane and condensation products of alkylene oxides with 4,4'-dihydroxydiphenyldimethylmethane.

Other acceptable monomers which can be used in the compositions according to the invention are acrylate terminated epoxy or ester units, i.e., reaction products of acrylic acid with hydroxy terminated ester or epoxy compounds, or low polymers thereof. Also contemplated by this invention are any other anaerobically curing monomers which, with their respective initiators, accelerators and stabilizers, i.e., inhibitors, are formulated according to the instant invention into a pressure sensitive anaerobic adhesive having the advantageous properties of the compositions of the instant invention.

Naturally, any of the above described acrylate and polyacrylate ester monomers can be used in combination, if desired.

The presently preferred anaerobic monomers are triethyleneglycol dimethacrylate; the reaction product of hydroxypropyl methacrylate with methylene-bisphenyl-4, 4'-diisocyanate; a polymer formed by methacrylate capping of a 1:1 adduct of toluene diisocyanate and hydrogenated 2,2-bis (4-hydroxyphenyl) propane as well as mixtures thereof.

There may also be present reactive monomers such as acrylic acid, methacrylic acid and the like which will cross-link with anaerobic monomers.

By the term "thermoplastic polymer system," as used herein, there is meant one or more high molecular weight thermoplastic polymers which, alone or in admixture, have a high enough average molecular weight in order that the resultant curable anaerobic pressure sensitive adhesive composition will have sufficient cohesive strength to be transferred from a conventional release surface to one substrate to be bonded to another substrate, alone, or in combination with a tackifier. Suitable average molecular weight will, of course, vary depending upon the type of thermoplastic polymer or polymer mixtures used, as well as upon the tackifier or tackifiers used, if any. Although it is desired that the polymers employed be compatible with the anaerobic resin system, they may be incompatible forming a heterogeneous system which remains pressure sensitive and transferable in nature and capable of curing. The word "combined" is used herein to indicate any workable combination, regardless of its physical form, of one or more thermoplastic polymers with one or more anaerobic monomers. Thus, a given combination may be a solution or otherwise and may or may not be homogeneous, provided only that it is useful in the pressure sensitive anaerobic composition of the invention.

Typical of the thermoplastic polymers which can be used are polyvinyl chloride, polyvinyl ethers, polyvinyl acetates; acrylic based polymers; polyurethanes, polyesters, polyamids, natural and synthetic elastomers and the like as well as mixtures thereof. The preferred thermoplastic polymers are polyvinyl chloride, polyurethanes, polyesters and acrylic based polymers.

By a "catalyst system" there is meant an acid or base catalyzed system typically containing at least one peroxy initiator, preferably, although not necessarily, at least one accelerator which preferably is a nitrogen containing compound and preferably, although not necessarily, at least one stabilizer against free radical polymerization for the anaerobic resin system.

Typical of the peroxy compounds which may be employed as initiators are the hydroperoxides, preferably organic hydroperoxides of the formula $R^6OOH$, wherein $R^6$ is generally a hydrocarbon radical containing up to about 18 carbon atoms, preferably an alkyl, aryl or aralkyl radical containing from 1 to about 12 carbon atoms. Typical examples are cumene hydroperoxide, methyl ethyl ketone hydroperoxide and the like.

As accelerators there may be mentioned liquid and solid organo-nitrogen compounds including but not limited to organic amides such as formamide, succinimide and the like; tertiary amines such as tributylamine, triethylamine, hexamethyl pararosaniline and the like; aromatic tertiary amines such as dimethyl paratoluidene and the like; organic sulfimides such as benzoic sulfimid and the like; as well as mixtures thereof. Normally solid organo-nitrogen compounds are particularly preferred as they have the least effect on the viscosity of the resulting composition as well as the least tendency to migrate from the composition.

Typical stabilizers are quinones, hydroquinones, and sterically hindered phenolic compounds.

Depending upon the amount of anaerobic resin system contained in the polymer system, the amount of initiator plus accelerator added will generally range from about 0.5 to about 20 percent or more by weight based on the total weight of the polymer system plus anaerobic resin system, and if present, a tackifier.

By the term "anaerobic pressure sensitive adhesive," there is meant a mixture of the thermoplastic polymer system, anaerobic resin system and the catalyst system and, if desired, a tackifier, which in a solvent-free state is permanently tacky at room temperature, and which firmly adheres to a variety of ordinary surfaces upon contact without the need of more than finger pressure. Further, it must conform to the surface irregularities of normal surfaces and have a sufficient shear modulus to resist removal subsequent to application to a surface.

To meet these criteria, the net, essentially solvent-free composition must have static shear strength of at least 2 minutes using a 250 gram test weight and a 0.25 square inch test surface and a 180° peel strength of at least 0.5 lb per inch, preferably 1.0 lb per inch, when measured by the standard tests specified herein and will separate from a conventional release surface such as a silicone coating and the like, without cohesive failure.

As indicated, a tackifier may be employed to induce or enhance pressure sensitive properties. Typical tackifiers are rosins, rosin derivatives, terpenes, synthetic tacky resins, low molecular weight polyacrylates and the like as well as mixtures thereof. The tackifiers employed in general have a molecular weight less than about 5,000, preferably below about 1,000.

The anaerobic pressure sensitive adhesive compositions of this invention normally contain substantial quantities of anaerobic resins in order that the thermoplastic polymer system employed will not interfere to any great extent with thorough and complete cross-linking or curing of the anaerobic resin system and to maximize ultimate bond upon cure. The anaerobic pressure sensitive adhesive compositions may contain, based on a total weight of anaerobic resin system and the thermoplastic polymer system, and if present, tackifiers, from 35 to 99% by weight anaerobic resin system, preferably from about 55 to about 95% by weight and more preferably from about 70 to about 90% by weight.

For certain applications, care should be taken in preparing the anaerobic pressure sensitive adhesives of this invention to cope with trace transition metal ions which may be present in each constituent of the composition, including the anaerobic resin system and the thermoplastic polymer system, typically picked up from the vessels and systems used in their production.

If allowed to remain in the composition, the transition metal ions, while present in concentrations too low to complete cure, may, even at room temperature, consume a certain quantity of the peroxy initiator. As a result, sufficient tackiness may be retained so that pressure sensitive adhesive properties will not be destroyed, but the ability of the composition to cure may diminish to a degree that ultimate bond strength will not be structural. That is, a cross-linked latticework will not develop throughout the applied pressure sensitive composition and cohesive failure may result. If necessary, the effect of transition metal ions in the compositions of this invention may be controlled by means, such as chelation, known to the art. When accelerated cure is desired, however, transition metal compounds (e.g., copper salts) may advantageously be used as primers or activators external to the pressure sensitive anaerobic composition of the invention.

One way to cope with the metal ions is to scavenge them prior to or following their admixture in a mutually compatible solvent prior to casting of the pressure sensitive adhesive layer onto a release liner, which may also require scavenging.

Typical of the solvents which are employed for dissolving the constituents of the pressure sensitive compositions are nonpolar aliphatics, aromatics, alcohols and the like which will not affect the peroxy compound. Ketones, for instance, should be avoided. Among the suitable solvents there may be mentioned toluene, isopropyl alcohol and mixtures thereof.

If the constituents of the pressure sensitive adhesive composition are properly scavenged, the active metals can be reintroduced, but in another form. Rather than being active in the composition, their effect may be rendered latent by encapsulating them in microspheres such that they will not be in contact with the peroxy initiator until the microspheres are ruptured upon the application of pressure to react with the peroxy compound to accelerate cure.

An alternative route to prevent premature cure during shelf life or storage is to encapsulate the peroxy compound alone or with its accelerators. Then the active metals or metal ions can be left in the pressure sensitive adhesive composition without fear that premature cure or deactivation will occur.

With care being taken to isolate the peroxy compound of the catalyst system by encapsulation or the elimination or isolation of active metal or metal ions, the pressure sensitive adhesive ingredients can be cast into a film on release coated surfaces or surfaces to be bonded without fear that premature cure or deactivation will occur.

Weight of pressure sensitive adhesive composition applied to a surface to be bonded may be varied over a wide range with the general object of achieving surface wetting for a strong and tenacious bond. Typical coating weights are, after solvent evaporation, from about 12 to about 40 grams of net solids per square meter.

When the anaerobic pressure sensitive adhesive is applied to differential release surfaces, it is required that the applied anaerobic pressure sensitive adhesive layer be removable from the release liner of maximum interfacial bond, typically a silicone coated liner, for transfer to a substrate without cohesive disruption of the anaerobic pressure sensitive adhesive layer. It is desirable for any given application to have the coating as thin as conveniently possible when the surface(s) to which the anaerobic pressure sensitive adhesive is applied provides the active metal accelerator. Cross-linking will then rapidly occur throughout the anaerobic resin and the surfaces will be bonded together. If the coating is too thick, longer cure times will be required or there would be formed an internal weakness which could result in cohesive failure of the partially cured resin.

As an alternative, by employing micro-encapsulated accelerators within the pressure sensitive adhesive composition, greater cure rates and complete cure can be realized. Surface priming with accelerators may also be employed.

In substance, the total anaerobic pressure sensitive adhesive system acts as a binding agent for the anaerobic monomers until cure is complete and then the residual constituents only serve as fillers for the system. However, higher thermoplastic polymer system concentrations can also aid in improving flexural strength of the cured composition at some potential sacrifice in shear strength.

The types of products typically formed are the self-wound tapes, the surface of the supporting tape having differential release properties, sandwich constructions in which the anaerobic pressure sensitive adhesive composition is contained between two carrier liners having differential release surfaces, and similar products. All that is necessary is that the anaerobic pressure sensitive adhesive layer be transferable to a substrate and completely separated from its carriers to leave only an anaerobic pressure sensitive adhesive in contact with the substrate to be bonded to another substrate.

Of course, it is also understood that the liquid anaerobic pressure sensitive adhesive can also be applied directly to a surface to be subsequently joined to another surface, provided the solvent is removed before such joining.

In the following Examples, one or more of the following anaerobic resin systems were employed for the formulation of anaerobic pressure sensitive adhesive compositions:

RESIN I

Approximately 75% of a reaction product of two moles of hydroxypropyl methacrylate with one mole of methylene-bis-phenyl-4,4'-diisocyanate and 25% triethyleneglycol dimethacrylate.

RESIN II

Approximately 66% of a polymer formed by hydroxypropyl methacrylate capping of a 1:1 adduct of toluene diisocyanate and hydrogenated 2,2-bis (4-hydroxyphenyl) propane, 26% hydroxypropyl methacrylate, 7% acrylic acid and 1% methacryloxypropyltrimethoxysilane.

The following test methods were employed in evaluating the pressure sensitive properties and properties of the cured end-products. In determining pressure sensitive adhesive properties, the adhesive composition was cast on a suitable support such as paper or Mylar.

Static Shear Strength — Federal Test Method Std. No. 147B, Method 20.1 (Load 250 grams)
180° Peel (dynamic — 12 inches/min) — ASTM D-1000/68
Lap Shear — ASTM D-1002/64

EXAMPLE I

To a heated flask equipped with a stirrer and a reflux condenser there was added 1800 grams of toluene, 1200 grams of Resin I and 300 grams of Resin II. The mixture was heated with stirring at 70° C until a homogeneous solution was formed. To the stirred solution there was added 300 grams of a thermoplastic vinyl chloride copolymer known as VAGH-2706 manufactured and sold by Union Carbide Corporation, and the mixture stirred until it again became homogeneous. To the resultant mixture there was added with stirring 180 grams of an aqueous alcoholic solution containing a chelating agent for trace transition metal ions. The solution was held at a temperature between 40°–50° C and stirred for 3 hours and the chelated transition metal ions removed.

To this solution there was added 70 grams of cumene hydroperoxide containing quinone, 37 grams of benzoic sulfimid and 37 grams of methylene-bis-dimethylaniline to form a catalyst system solution.

The anaerobic pressure sensitive adhesive solution was coated onto the release surface of a backing sheet fabricated from a plastic film and a paper having a silicone release coating. Coating weight after solvent removal was 28 grams per square meter. Another release sheet was applied to protect the anaerobic pressure sensitive adhesive.

A portion of the anaerobic pressure sensitive adhesive was tested for pressure sensitive properties. When applied to a paper support, the 250 gram static shear value was 5.5 minutes. The 180° peel test value on a Mylar support was 1.75 lbs/in and failure was cohesive. Surface tack was about 2 inches.

Two aluminum alloy plates measuring 1 inch × 4 inches × 1/16 inch were each etched on one end with a mixture of chromic and sulfuric acids to form a roughened surface. To one roughened surface there was applied a ½inch ×0 1 inch layer of the anaerobic pressure sensitive adhesive. The roughened end of the other plate was placed on the anaerobic pressure sensitive adhesive in overlapping relation thereby excluding oxygen and initiating cure. The copper in the aluminum alloy accelerated cure and the anaerobic pressure sensitive adhesive bonded plates were allowed to cure for 24 hours at room temperature. The bonded plates were tested in an Instron tester and the bond was found to give a lap shear tensile value of 900 psi.

EXAMPLE II

To a reactor equipped with a stirrer there was added at room temperature and with agitation 500 grams of toluene and 350 grams of tackifier known as AROFENE 8318 (manufactured by Ashland Chemical Co.). Agitation was continued until a solution resulted.

To another reactor there was added with stirring 2700 grams of a polyurethane resin known as WITCOBOND-308, (sold in 25% solids solutions in toluene/isopropanol, having a viscosity of 7,000–15,000 cp as measured by Brookfield viscometer LVF, spindle No. 4, at 12 rpm and 77° F, manufactured by Witco Chemical Co.) 500 grams of toluene and 1000 grams of isopropanol until a solution was formed.

The contents of both reactors were combined and thoroughly mixed. To the resultant solution there was added 500 grams of an alcohol solution containing a chelating agent for transition metals and the mixture stirred for three hours at room temperature.

To the solution there was added 4000 grams of Resin I and the mixture stirred until a solution resulted.

To the resultant solution there was added a catalyst system comprising 240 grams of cumene hydroperoxide containing quinone, 240 grams of benzoic sulfimid and 240 grams of methylene-bis-dimethylaniline.

As in Example I, the anaerobic pressure sensitive adhesive was coated on the release surface of a support and residual solvent removed to form an anaerobic pressure sensitive layer of a weight of 28 grams per square meter. The formed adhesive layer was protected with a second release coated sheet.

The resultant anaerobic pressure sensitive adhesive layer, prior to cure, was determined to have a 250 gram static shear value of from 2.2 to 3.4 hrs, a 180° peel value of 1 lb/in. and a surface tack about 1 inch.

The procedure of Example I to determine lap shear was repeated. The lap shear tensile value was determined to be about 1200 psi.

What is claimed is:
1. A curable, essentially solvent free anaerobic pressure sensitive adhesive composition comprising a mixture of:
    a. about 35 to about 99 percent by weight of an anaerobic resin system which is stable in the presence of oxygen and which contains at least one anaerobically curable resin having at least one polymerizable acrylate ester moiety;
    b. about one to about 65 percent by weight of a thermoplastic polymer system containing at least one high molecular weight urethane polymer capable of combining a substantial quantity of said anaerobic resin system;
    c. about 0.5 to about 20 percent, based on the total weight of (a) and (b), of a catalyst system for said anaerobic resin system, said catalyst system comprising a peroxy compound, an organic compound for accelerating cure of said anaerobic resin system and a stabilizer for said anaerobic resin system,
said anaerobic pressure sensitive adhesive, when in an essentially solvent-free state, being permanently tacky at room temperature and having a static shear strength of at least about two minutes at a 250 gram load per 0.25 square inch and a 180° peel value of at least about 0.5 lb. per inch, and curable upon substantial exclusion of oxygen.

2. The composition of claim 1 wherein the organic compound for accelerating cure is an organo-nitrogen compound.

3. The composition of claim 1 in which a tackifying resin is present.

4. The composition of claim 1 in which the anaerobic resin system is present in an amount of from about 55 to about 95% by weight based on the total weight of said anaerobic resin system and said polymer system.

5. The composition of claim 3 in which the anaerobic resin system is present in an amount of from about 35 to about 99% by weight based on the total weight of said anaerobic resin system, said polymer system and said tackifying resin.

6. The composition of claim 3 in which the anaerobic resin system is present in an amount of from about 55 to about 95% by weight based on the total weight of said anaerobic resin system, said polymer system and said tackifying resin.

7. The composition of claim 1 which contains a microsphere encapsulated active metal which is capable of accelerating cure of said anaerobic resin system upon rupture of the microspheres.

8. The composition of claim 1 which contains an active metal compound capable of accelerating cure when brought into contact with a peroxy compound and wherein the peroxy compound is microencapsulated in microspheres, the cure of said anaerobic pressure sensitive adhesive composition being initiated upon rupture of said microcapsules.

9. The composition of claim 1 in which the anaerobic resin system contains at least one monomer selected from the group consisting of triethyleneglycol dimethacrylate; the reaction product of 2 mols of hydroxypropyl methacrylate with one mole of methylene-bis-phenyl-4,4'-diisocyanate; the hydroxypropyl methacrylate end-capped reaction product of a 1:1 adduct of toluene diisocyanate and hydrogenated 2,2-bis-(4-hydroxyphenyl) propane; and mixtures thereof.

10. The composition of claim 3 in which the anaerobic resin system contains at least one monomer selected from the group consisting of triethyleneglycol dimethacrylate; the reaction product of 2 mols of hydroxypropyl methacrylate per mole of methylene-bisphenyl-4,4'diisocyanate; the hydroxypropyl methacrylate endcapped reaction product of a 1:1 adduct of toluene diisocyanate and hydrogenated 2,2-bis-(4-hydroxyphenyl) propane; and mixtures thereof.

11. The composition of claim 1 in which the catalyst system is present in an amount from about 0.5 to about 20% by weight based on the total weight of the anaerobic resin system and the thermoplastic polymer system.

12. The composition of claim 3 in which the catalyst system is present in an amount from 0.5 to about 20% by weight based on the total weight of the said anaerobic resin system, said thermoplastic polymer system and said tackifier system.

* * * * *

UNITED STATES PATENT OFFICE
CERTIFICATE OF CORRECTION

Patent No. 3,996,308      Dated December 7, 1976

Inventor(s) Maurice Douek, Gustav A. Schmidt, Bernard M. Malofsky and Martin Hauser It is certified that error appears in the above-identified patent and that said Letters Patent are hereby corrected as shown below:

At column 4, line 33: after the word "is" insert -- -O- or --.

At column 9, line 43: delete the numeral "0".

Signed and Sealed this

Fourth Day of October 1977

[SEAL]

Attest:

RUTH C. MASON  
*Attesting Officer*

LUTRELLE F. PARKER  
*Acting Commissioner of Patents and Trademarks*